United States Patent [19]

Kewley et al.

[11] 4,159,763
[45] Jul. 3, 1979

[54] INSPECTABLE MODULAR CONVEYOR

[75] Inventors: Monte L. Kewley, New Orleans; LeRoy E. Demarest, Kenner, both of La.

[73] Assignee: The Laitram Corporation, New Orleans, La.

[21] Appl. No.: 821,136

[22] Filed: Aug. 2, 1977

[51] Int. Cl.² ............................................. B65G 17/06
[52] U.S. Cl. .................................. 198/853; 74/245 C; 74/250 C; 74/245 P
[58] Field of Search ............... 198/851, 853, 844, 850; 74/245 R, 245 C, 245 LP, 245 P, 250 R, 250 C

[56] References Cited

U.S. PATENT DOCUMENTS

| 1,936,764 | 11/1933 | King | 198/851 |
| 3,870,141 | 3/1975 | Lapeyre et al. | 198/853 |

FOREIGN PATENT DOCUMENTS

| 694790 | 7/1953 | United Kingdom | 198/851 |
| 1127316 | 9/1968 | United Kingdom | 198/851 |

Primary Examiner—Joseph E. Valenza
Attorney, Agent, or Firm—Weingarten, Maxham & Schurgin

[57] ABSTRACT

A conveyor belt comprising a plurality of like modules on each end of which are an array of link ends. The link ends are of a width substantially less than the spacing between confronting link ends along their pivotal axis. The link ends of each module are pivotally connected to the link ends of adjacent modules by a pivot pin. The pivotally connected modules can be laterally flexed or movable along the pivot axis for exposure to visual inspection of the normally concealed portions of the pivot pins.

8 Claims, 3 Drawing Figures

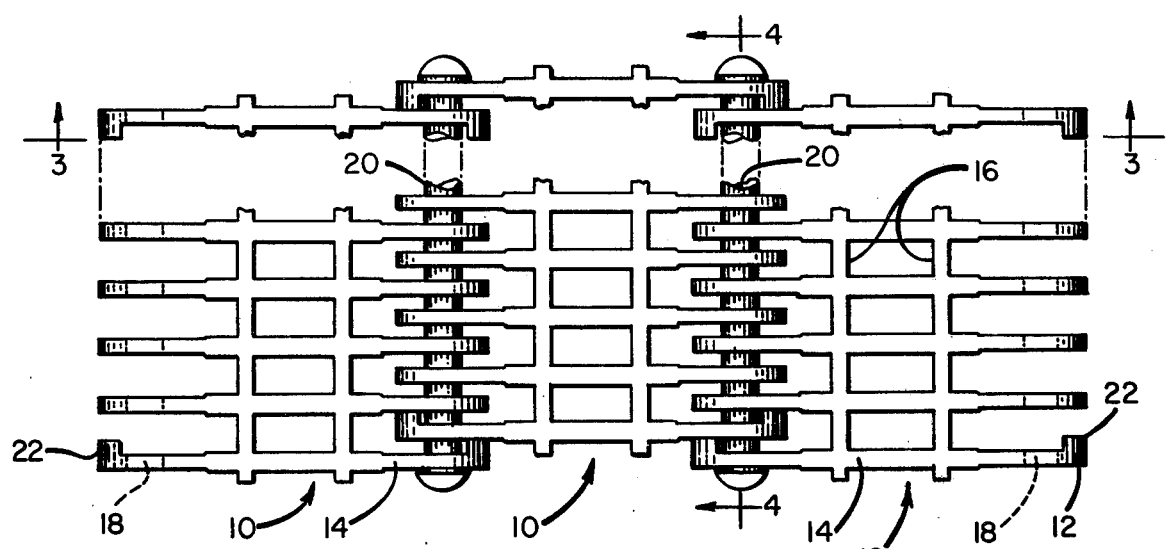
FIG. 2
FIG. 3
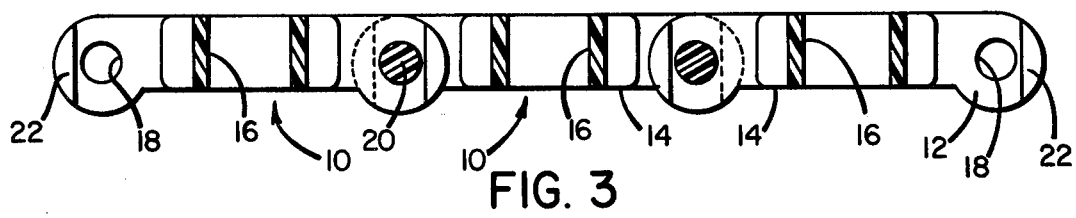
FIG. 4
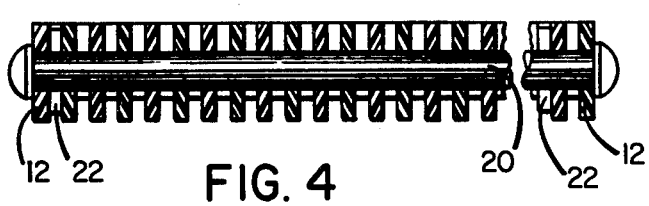
FIG. 6
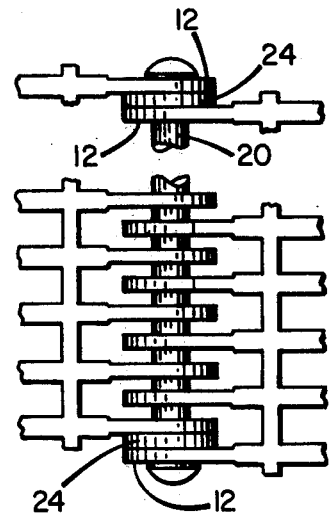
FIG. 5
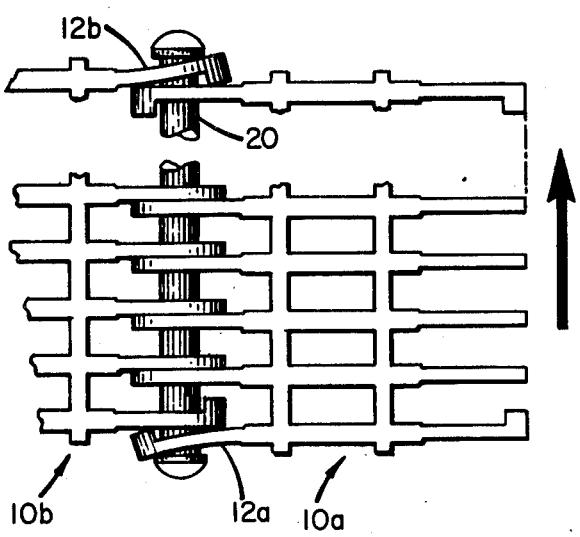

INSPECTABLE MODULAR CONVEYOR

FIELD OF THE INVENTION

This invention relates to conveyors and more particularly to a modular conveyor belt comprising connected modules each comprising a plurality of preassembled link like elements.

BACKGROUND OF THE INVENTION

A modular conveyor belt is the subject of U.S. Pat. No. 3,870,141 which comprises modules pivotally connected to one another, each module being molded as a single unit preferably of a plastic material. Each module includes a number of parallel spaced links having end sections with aligned holes for accommodation of pivot rods, and intermediate sections joined by integral cross members to form a rigid supporting grid. The modules are end-to-end matable and reversable; that is, a module is capable of being connected to or mate with a like module at their ends irrespective of which end of which module is employed. The conveyor module thus formed is simple and inexpensive to manufacture and assemble into a conveyor belt or the like of any width and length.

For some purposes, especially in the food industry, it is desirable that the conveyor be readily cleaned and readily inspected to assure cleanliness. Government regulations also specify standards of cleanliness for equipment used in processing products for human use. It is the object of this invention to provide a conveyor belt which is constructed to be easily cleaned and easily inspected. The novel conveyor is similar to the conveyor of the aforesaid U.S. Pat. No. 3,870,141 but different in significant respects to achieve the purposes of the present invention.

SUMMARY OF THE INVENTION

In brief, the conveyor belt of the present invention comprises a plurality of like modules on each end of which are an array of link ends, each link end being of a width substantially less than the spacing between confronting link ends along their pivotal axis. The link ends of each module are pivotally connected to the link ends of an adjacent module by a pivot pin passing through aligned openings in the link ends of the modules. Means are associated with each module to maintain the relative position of adjacent modules along the pivotal axes, with the engaged link ends of adjacent modules in spaced apart confronting relation. A substantial space exists between confronting link ends of connected modules to permit visual inspection of the pivot pins and cooperative link ends. The modules can be laterally flexed or moved along the pivot axis for exposure to visual inspection of the normally concealed portions of the pivot pins.

DESCRIPTION OF THE DRAWINGS

The invention will be more fully understood from the following detailed description taken in conjunction with the accompanying drawings in which:

FIG. 2 is a plan view, partly broken away, of a modular conveyor embodying the invention;

FIG. 3 is a sectional view taken along line 3—3 of FIG. 2;

FIG. 4 is a sectional view taken along line 4—4 of FIG. 2;

FIG. 5 is a plan view, partly broken away, of a modular conveyor embodying the invention and illustrating lateral displacement of connected modules; and FIG. 6 is a plan view, partly broken away, of an alternative embodiment of the modular conveyor.

DETAILED DESCRIPTION OF THE INVENTION

Figure 1:
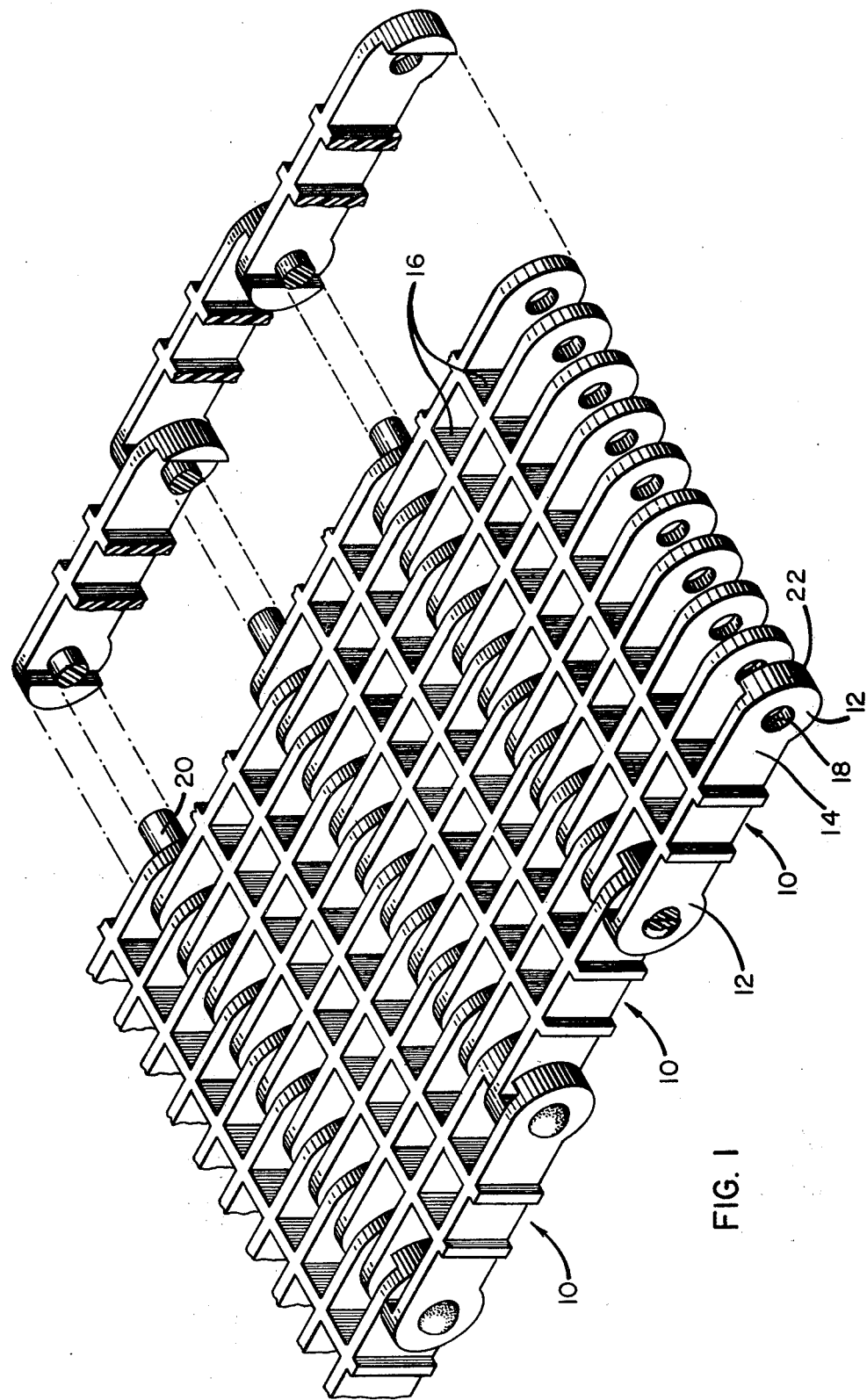
FIG. 1 is a perspective view, partly broken away, of a modular conveyor embodying the invention.

The modular conveyor constructed according to the invention is illustrated in FIGS. 1 and 2 and comprises modules 10 which are each formed as an integral unit of a plastic material by well known injection molding or other molding processes. Each module 10 includes a multiplicity of elongated, parallel, spaced link like elements, the length of the module being equal to the length of each link and the width of the module being determined by the number of links.

All of the link like elements are substantially identical and each include end sections 12 joined by an intermediate connecting section 14 having a generally rectangular cross section with a greater depth than width. The link like elements are joined as a unit by at least one and preferably a pair of spaced cross members 16 formed integrally with connecting sections 14 to form a rigid open structure. End sections 12 when viewed in side elevation, have at least a partially circular cross section and are formed to circumscribe corresponding ones of aligned holes 18 for receiving pivot pins or rods 20 adapted to pivotally connect the modules end to end while laterally aligning adjacent modules. The ends of cross members 16 extend beyond the end ones of connecting sections 14 so that cross members of laterally adjacent modules will abut one another when assembled as a conveyor belt. The cross members 16 maintain the link like elements in parallel relation so that the faces of end sections 12 remain parallel and pivot holes 18 remain aligned, to minimize bending stresses across rods 20. The rods 20 are preferably preformed with a head on one end, the other end of the rod being headed such as by heating after insertion of the rod through the aligned holes 18 of interconnected modules 10.

The link ends 12 are each of a width substantially less than the spacing between confronting link ends along the pivotal axis. In the illustrated embodiment, the link ends 12 are of the same width as connecting sections 14. With the modules interconnected by pivot rods 20, as illustrated in FIGS. 1 and 2, a substantial space exists between confronting link ends to permit visual inspection of the pivot rods and cooperative link ends. In the illustrated embodiment, about 50% of the pivot rod surface is visible between the spaced link ends of connected modules.

Each module includes means for maintaining the lateral position of adjacent modules along the pivotal axis, with the engaged link ends of adjacent link modules being in spaced apart confronting relation. As shown in FIGS. 1 and 2, a boss or spacer 22 is provided on the link ends 12 of one link like element of each module 10. Each boss 22 extends along the direction of the pivotal axis toward the confronting link end by an amount to engage the confronting surface of the link end of an adjacent connected module, which also includes a boss 22 engaging the confronting surface of the link end of the other module. The interconnected modules are thus maintained in intended spaced relationship to expose and provide access to the exposed portions of pivot rods 20 and associated link ends 12. For convenience and uniformity of manufacture, each module can include a pair of bosses 22 on the opposite link ends of one link like element, as in the embodiment of FIGS. 1 and 2. However, the bosses or other spacing elements can be variously provided. Alternatively, for example, spacer washers 24 can be provided, as shown in FIG. 6, between confronting link ends of the outermost pairs of links to maintain the intended spaced confronting relationship of the interconnected modules.

The modules interconnected by the cooperative pivot rods can be laterally moved in either direction along the pivot axis. As shown in FIG. 5, module 10a is depicted as being urged in the direction of the arrow to a position at which the link ends engage the confronting link ends of module 10b. Link end 12a of module 10a and link end 12b of module 10b are flexed by a manual or other force applied to the modules to permit the lateral movement of the interconnected modules. By such flexure, the normally concealed portions of pivot rods 20 are exposed for visual inspection and cleaning. Individual link ends of interconnected modules can also be flexed along the pivot axis, either manually or by use of a tool, for visual inspection of portions of the pivot rods normally concealed by those link ends.

The invention can be embodied in a modular conveyor belt of various different constructions. For example, the invention can be employed with any of the modular belt versions shown in the aforesaid U.S. Pat. No. 3,870,141. Accordingly, the invention is not to be limited by what has been particularly shown and described except as indicated in the appended claims.

What is claimed is:

1. A conveyor belt comprising in combination:
    a plurality of like modules, each of said modules including a first plurality of link ends of like width, a second plurality of link ends each of said like width, and an intermediate section integrally formed with and joining said first and second plurality of link ends;
    said link ends of each said modules being releasably engaged between link ends of an adjacent module except for individual link ends disposed at the extreme sides of said module;
    a pivot rod for pivotally connecting said modules at engaged link ends;
    said link ends of each of said modules being of a width substantially less than the spacing between confronting link ends along the pivotal axes thereof to provide a substantial space between confronting link ends thereby to expose for inspection and cleaning a substantial portion of the pivot rod connecting adjacent modules;
    said modules being arranged in staggered relation with a side edge of each module being disposed intermediate the side edges of an adjacent pivotally connected module;
    a spacer means positioned between at least one pair of confronting link ends along each pivot rod, said spacer means extending along the direction of the pivotal axis and in engagement with the confronting surfaces of said pair of link ends, thereby to maintain the spaced confronting relation between the other connected link ends for exposure of the interconnecting pivot rod; and
    the link ends associated with said spacers being resilient to permit lateral movement of a module relative to an adjacent connected module along the pivotal axis to expose normally concealed portions of the interconnecting pivot rod.

2. The conveyor belt of claim 1 wherein said spacer includes a boss on one link end of each plurality of link ends of said modules.

3. The conveyor belt of claim 1 wherein said spacer includes a spacer washer between one pair of confronting link ends of adjacent connected modules.

4. The conveyor belt of claim 1 wherein each of said modules are of integrally molded plastic.

5. The conveyor belt of claim 1 wherein said link ends of each of said modules are of a width in relation to the spacing between confronting link ends to expose about 50% of the pivot rod connecting adjacent modules.

6. The conveyor belt of claim 4 wherein said spacer is integral with its link end.

7. The conveyor belt of claim 4 wherein each link end of said modules is resilient to permit lateral flexing to expose normally concealed portions of the interconnecting pivot rod.

8. A module for constructing a linked conveyor belt, said module comprising, in combination:
    a first plurality of link ends of substantially identical width, each being formed to circumscribe a pivotal hole, said holes of said first plurality being arranged coaxially;
    a second like plurality of link ends of substantially identical width, each being formed to circumscribe a pivotal hole, said holes of said second plurality being arranged coaxially the axes of respective holes of both pluralities of link ends being substantially parallel; and
    a plurality of spaced apart elongated members each integrally formed with and joining a pair of corresponding link ends of said first and second pluralities, said members being joined by at least one cross rib also formed integrally therewith and extending parallel to said axes;
    said link ends being of a width substantially less than the spacing between confronting link ends along the axes thereof to provide a substantial space between confronting link ends thereby to expose for inspection and cleaning a substantial portion of a pivot rod passing through the coaxially arranged holes and connecting adjacent modules; and
    a spacer attached to at least one link end of said module and extending along the direction of the pivotal axis for engagement with the confronting surface of the link end of an adjacent connected module, thereby to maintain the spaced confronting relation between the other connected link ends for exposure of the interconnecting pivot rod.

* * * * *